S. GODARD.
GRASSHOPPER-CATCHER.
No. 191,421.                           Patented May 29, 1877.
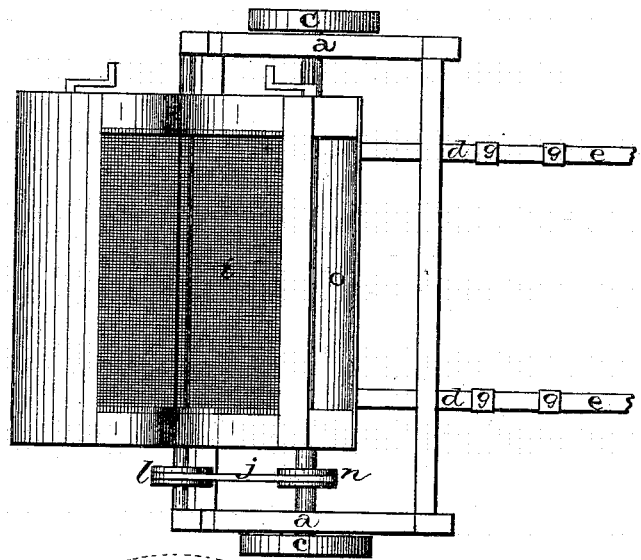
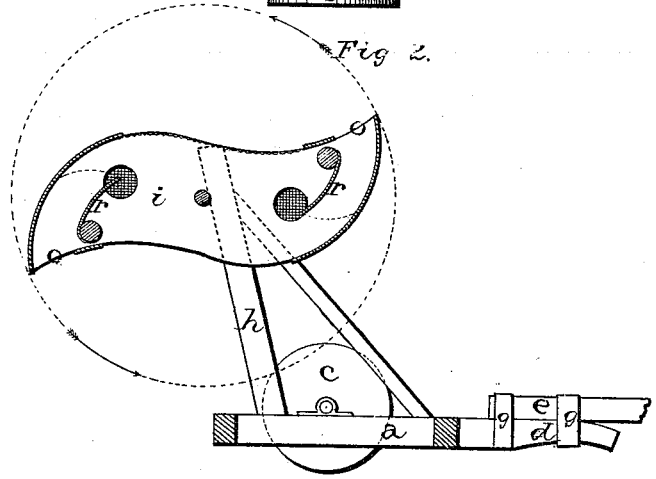
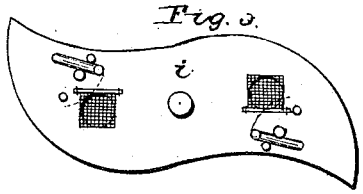
WITNESSES
INVENTOR

UNITED STATES PATENT OFFICE.

SAMUEL GODARD, OF MARYSVILLE, MISSOURI.

IMPROVEMENT IN GRASSHOPPER-CATCHERS.

Specification forming part of Letters Patent No. 191,421, dated May 29, 1877; application filed April 26, 1877.

*To all whom it may concern:*

Be it known that I, SAMUEL GODARD, of Marysville, in the county of Nodaway and State of Missouri, have invented certain new and useful Improvements in Grasshopper-Catcher; and I do hereby declare the following to be a full, clear, and exact description of the invention, such as will enable others skilled in the art to which it pertains to make and use it, reference being had to the accompanying drawings, which form part of this specification.

My invention relates to an improvement in grasshopper-catchers; and it consists in a frame that is mounted upon wheels, and a revolving wire frame which is provided with an opening at each end, so that as the machine is pushed forward the wire frame will revolve and catch the insects as they rise in the air from the ground in front of the machine, as will be more fully described hereinafter.

The accompanying drawings represent my invention.

Figure 1 is a plan view of my invention. Fig. 2 is a vertical section of the same. Fig. 3 is an end view of the revolving frame.

$a$ represents a suitable rectangular frame, which is mounted upon the two wheels $c$, and provided with the two handles $d$, so that the whole machine may be pushed before a man, like a wheelbarrow. Where the machine is too large to be pushed by a man, the shafts $e$ may be fastened upon the top of the handles by means of bands or loops $g$, substantially as shown, or of any other form, and then a horse be used for moving the machine about over the ground.

Mounted upon the top of the frame are the two brace-standards $h$, and journaled upon these standards is the revolving wire-covered frame $i$, of the form shown, and which is made to revolve by a belt, $j$, that passes over the pulley $l$ on the end of the shaft on which the frame revolves, and down around the pulley $n$, fastened to the axle of one of the driving-wheels. The frame $i$ has two openings, $o$, one in each end, that extends the whole length of the frame; and inside of the frame, to each opening, there is a hinged door, $r$, which is held open by its crank while the machine is in operation, and then closed as soon as the hoppers are caught, so that they cannot escape. In one or both ends of the frame there are made openings or doors, through which the captured hoppers can be removed from the frame to be destroyed.

This machine is to be pushed over the ground, and, as the hoppers rise in swarms before its approach, the revolving frame, with its opening at each end, flies around and gathers them in. After they are once in they can never escape the way they got in.

Having thus described my invention, I claim—

1. In a grasshopper-catcher, the revolving frame $i$, having an opening in each end, and a door for closing the same, substantially as set forth.

2. The combination of the frame $a$, wheels $c$, handles $d$, shafts $e$, and fastening devices $g$, whereby the machine can be moved either by man or horse power, substantially as shown.

3. The combination of the revolving frame $i$, having an opening at each end, with the standards $h$, frame $a$, wheel $c$, pulleys $l$ $n$, and belt $j$, substantially as described.

In testimony that I claim the foregoing I have hereunto set my hand this 16th day of April, 1877.

SAMUEL GODARD.

Witnesses:
R. M. CORDILL,
S. M. GODARD,
HORACE M. JACKSON.